United States Patent
Carmel et al.

(10) Patent No.: US 7,792,830 B2
(45) Date of Patent: Sep. 7, 2010

(54) ANALYZING THE ABILITY TO FIND TEXTUAL CONTENT

(75) Inventors: David Carmel, Haifa (IL); Adam Darlow, Haifa (IL); Shai Fine, Ranana (IL); Dan Pelleg, Haifa (IL); Elad Yom-Tov, Hoshaya (IL)

(73) Assignee: International Business Machines Corporation, Armonk, NY (US)

( * ) Notice: Subject to any disclaimer, the term of this patent is extended or adjusted under 35 U.S.C. 154(b) by 160 days.

(21) Appl. No.: 11/461,464

(22) Filed: Aug. 1, 2006

(65) Prior Publication Data

US 2008/0033971 A1 Feb. 7, 2008

(51) Int. Cl.
G06F 7/00 (2006.01)
G06F 17/30 (2006.01)
G06F 15/18 (2006.01)
G06F 17/00 (2006.01)
G06N 5/02 (2006.01)

(52) U.S. Cl. .............. 707/728; 707/727; 707/730; 707/731; 706/12; 706/47

(58) Field of Classification Search .......... 707/3
See application file for complete search history.

(56) References Cited

U.S. PATENT DOCUMENTS

| 6,304,864 | B1 * | 10/2001 | Liddy et al. ............ 706/15 |
| 6,571,225 | B1 * | 5/2003 | Oles et al. ............. 706/12 |
| 6,684,202 | B1 * | 1/2004 | Humphrey et al. ......... 706/45 |
| 6,711,585 | B1 * | 3/2004 | Copperman et al. ...... 707/104.1 |
| 6,732,090 | B2 * | 5/2004 | Shanahan et al. ......... 707/3 |
| 6,778,979 | B2 * | 8/2004 | Grefenstette et al. ...... 707/3 |
| 6,820,075 | B2 * | 11/2004 | Shanahan et al. ......... 707/3 |
| 6,829,599 | B2 * | 12/2004 | Chidlovskii ............. 707/3 |
| 6,847,961 | B2 * | 1/2005 | Silverbrook et al. ...... 707/3 |
| 6,876,997 | B1 * | 4/2005 | Rorex et al. ............ 707/3 |
| 7,028,020 | B1 * | 4/2006 | Keskar et al. ........... 707/1 |
| 2005/0038781 | A1 * | 2/2005 | Ferrari et al. ........... 707/4 |

OTHER PUBLICATIONS

Junxi Xu; Query Expansion Using Local and Global Document Analysis;1996; ACM; pp. 4-7.*
Debashish Niyogi; The use of document structure analysis to retrieve information from documents in digital libtaries; 1997;pp. 1-12.*

* cited by examiner

Primary Examiner—Neveen Abel Jalil
Assistant Examiner—Jermaine Mincey (57) ABSTRACT

A method and system for analyzing a document set (202, 420) are provided. The method includes determining a set of terms (312) from the terms of the document set that minimizes a distance measurement (405) from the given set of documents (420). The method includes using a greedy algorithm to build the set of terms incrementally, at each stage finding a single word that is closest to the document set (202, 420). The set of terms is evaluated to assess the ability to find the document set (202, 420). The set of terms are compared with expected terms to evaluate the ability to find the document set (202, 420). A measure of the ability to find a document set (202, 420) is provided by computing a distance measure (403) between a document set and an entire collection.

15 Claims, 7 Drawing Sheets

ANALYZING THE ABILITY TO FIND TEXTUAL CONTENT

FIELD OF THE INVENTION

This invention relates to the field of information retrieval. In particular, it relates to analyzing the ability to find textual content.

BACKGROUND OF THE INVENTION

Content Management, also known as CM, is a set of processes and technologies supporting handling digital information. This digital information is often referred to as digital content. Currently, people managing content have very few tools to tell them, a priori, if users will be able to locate their content.

"Findability" is the term used to refer to the quality of being locatable or the ability to be found. Findability has become highly relevant with the expansion of the World Wide Web. However, findability is not limited to the web and can equally be applied to other environments. The structure, language and writing style used for content description all have a huge effect on the "findability" of content by users searching for information encapsulated in that content.

This document focuses on textual content. For example, a set of textual documents such as web pages belonging to a specific web site or intranet site. Content in this case is referring to the textual content of these pages, and to the anchor text of hyper-links pointing to these pages. Textual content may also be retrieved in the form of a single document or related documents from a database, or other repository.

Content may be difficult to find due to poor content, structure, or because it is indistinguishable from other content. Search engines are programs designed to help find information. A user asks a search engine to locate content relevant to his information need. This need is specified by the user's "query" submitted to the search engine. A query might be a free text expression, or any Boolean expression complying with the query syntax supported by the search engine. The search engine retrieves a ranked list of documents which match the user's query. Ranking is determined according to the expected relevance of the documents to the user's information need.

In some known cases, it is possible in retrospect, to estimate the findability of the content. This can be done by observing the queries which successfully brought users to the specific content. However, in such cases it is impossible to know which queries users typed that failed to bring them the content.

Also, there is a wide field known as Search Engine Optimization (SEO) which attempts to modify the content of web pages so as to bring them to the top ranking of a search engine. SEO is usually based on examining search logs for query terms entered by users. SEO provides tips for restructuring of web pages. For example, SEO is used to provide the following information to a web site owner:
  Percentage of traffic generated by site search and external search engines.
  Which query terms are currently driving traffic to the site.
  Which terms are the most popular on external engines and how to optimize for those words.
  Details on current ranking/positioning in the major external engines.
  Detailed page-level audits with recommendations for improvement.

A related application is selection of words that trigger the display of advertisements on the web. An advertising contractor typically auctions keywords to advertisers. The advertisers need to choose and to price the optimal words and phrases to be associated with their site. Existing tools for term selection are based solely on co-occurrence frequency analysis of historical search logs, and require the advertiser to first provide at least one search term. In other words, they offer refinement of phrases given to them as input, and the only guidance they give is based on historical frequencies, where higher frequency is preferred.

SUMMARY OF THE INVENTION

It is an aim of the present invention to provide analysis of textual content findability for a document or document set without the use of data of query logs of previous users' query terms.

The invention aims to provide tools for analysis of a document or document set, such as web pages of a web site or an intranet site, such that content managers can be informed of the ability of users to find their content, regardless of the specific search engine that may be used. Such tools will detect content with low findability, as well as providing suggestions for improving the document set's findability.

According to a first aspect of the present invention there is provided a method for analyzing a document set, comprising: providing a document set; determining a set of terms from the terms of the document set that minimizes a distance measurement from the given document set. The set of terms is preferably used to evaluate and improve the findability of the document set. The terms may be words, parts of words, or multiple words forming collocates or phrases.

The document set and the set of terms may be modelled by probability distributions of the terms in the sets and a distance measurement generated between the probability distributions.

In one embodiment, the distance measurement is the Jensen-Shannon divergence (JSD). The method may include using a greedy algorithm to build the set of terms incrementally, at each stage finding a single word that is closest to the document set.

The method may include evaluating the set of terms to assess the ability to find the document set. This may be done by comparing the set of terms with expected terms to evaluate the ability to find the document set.

The method may also include the steps of: creating a sequence of queries from the set of terms; executing the sequence of queries in a search engine; computing the average precision for each query; and analyzing the average precision against the number of terms.

Analyzing the average precision against the number of terms may include clustering the results into categories of behaviour. The categories of behaviour may include: easily findable document sets, document sets requiring long queries to be located, and document sets which are not findable.

The method may include simulating changes to the text of the document set to improve the ability to find the document set. The method may also include determining the distance measurement of a specific term to the document set.

The method may include comparing a set of terms for a first document set with sets of terms for one or more other document sets; and determining similar document sets which may be confusable. The step of comparing may be carried out by measuring the overlap of the sets of terms.

According to a second aspect of the present invention there is provided a method for analyzing a document set, comprising: computing a distance measure between a document set and an entire collection; and using the distance measure as a prediction of the ability to find the document set in the collection. The document set and the set of terms may be modelled by probability distributions of the terms in the sets and a distance measurement generated between the probability distributions. The distance measure may be the Jensen-Shannon divergence. The document set may be an intranet site and the entire collection may be the intranet.

According to a third aspect of the present invention there is provided a computer program product stored on a computer readable storage medium, comprising computer readable program code means for performing the steps of: determining a set of terms from the terms of the document set that minimizes a distance measurement from the given document set.

According to a fourth aspect of the present invention there is provided a method of providing a service to a client over a network, the service comprising the method steps of: determining a set of terms from the terms of the document set that minimizes a distance measurement from the given document set.

According to a fifth aspect of the present invention there is provided system for analyzing a document set, comprising: a server computer providing a document set for access by client computers across a network; and a document set analyzer for determining a set of terms from the terms of the document set that minimizes a distance measurement from the given document set.

The means for determining the set of terms may include a greedy algorithm means to build the set of terms incrementally, at each stage finding a single word that is closest to the document set.

The system may include means for evaluating the set of terms to assess the ability to find the document set.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

It is assumed that a document or a document set is given, and it is necessary to analyze these documents including estimating how easy it is for a user to find these documents. As discussed in the background section above, this is akin to the notion of findability in the field of search engine optimization (SEO), where the goal is to optimize document representation so that they will be found easily for related queries by any search engine searching over that domain. However, the described method differs from SEO methods as it does not assume an adversarial model, and thus is suitable for intranet scenarios where it is undesirable to have intranet pages mask other pages (unlike the internet, where one shop would very much like to have all shopping traffic diverted to it), or where a query log is unavailable.

A user finds relevant documents by using query terms which are submitted to a search engine. It is therefore important to ensure that documents are found by the most appropriate query terms.

Figure 1:
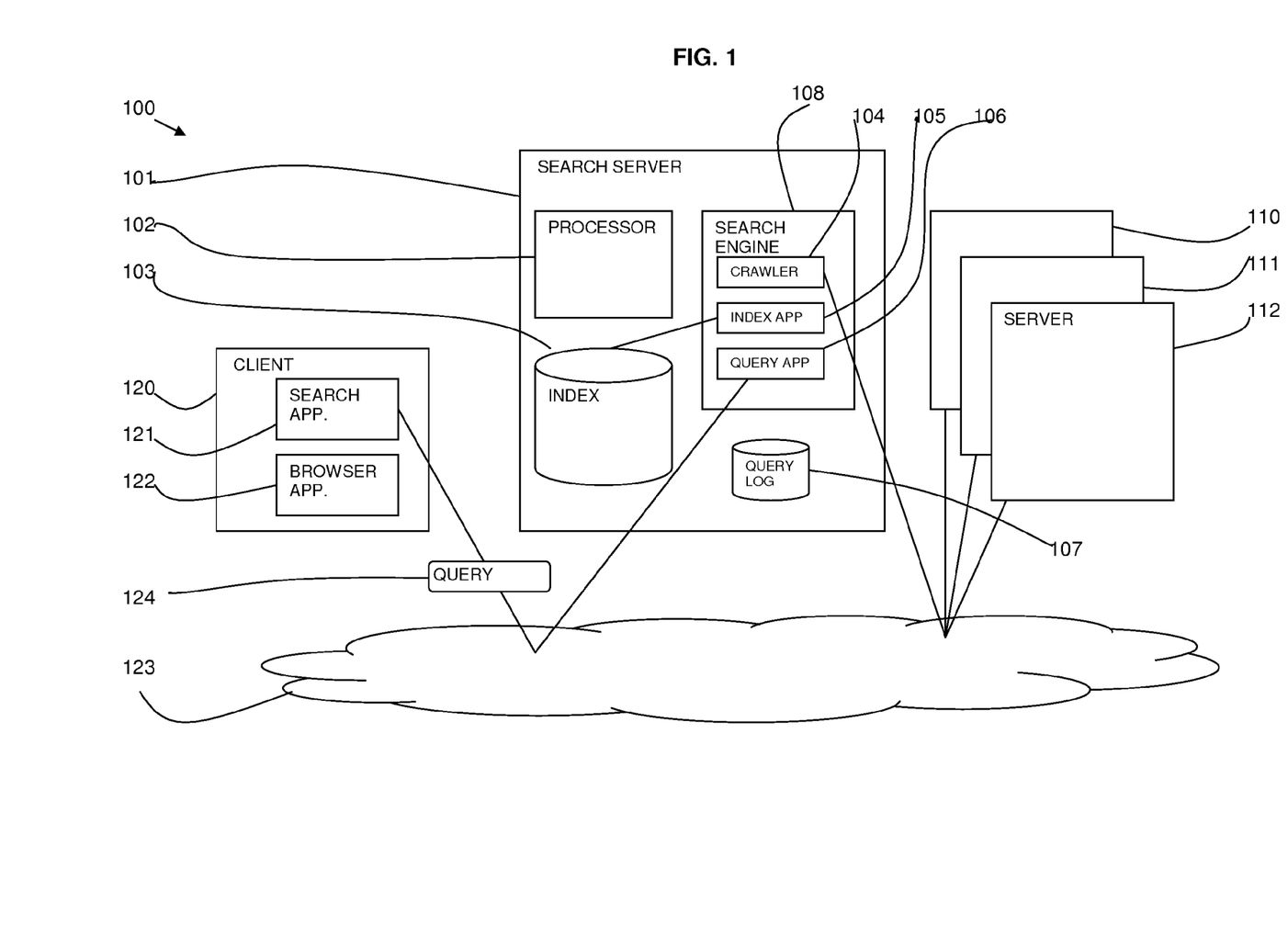
FIG. 1 is a block diagram of a search system in which the present invention may be used.

Referring to FIG. 1, an example embodiment of a search engine system 100 as known in the prior art is shown. A server system 101 is provided generally including a central processing unit (CPU) 102, with an operating system, and a database 103. A server system 101 provides a search engine 108 including: a crawler application 104 for gathering information from servers 110, 111, 112 via a network 123; an application 105 for creating an index or catalogue of the gathered information in the database 103; and a search query application 106.

The index stored in the database 103 references URLs (Uniform Resource Locator) of documents in the servers 110, 111, 112 with information extracted from the documents.

The search query application 106 receives a query request 124 from a search application 121 of a client 120 via the network 123, compares it to the entries in the index stored in the database 103 and returns the results in HTML pages. When the client 120 selects a link to a document, the client's browser application 122 is routed straight to the server 110, 111, 112 which hosts the document.

The search query application 106 keeps a query log 107 of the search queries received from clients using the search engine 103. In conventional methods, the query log 107 is often used to analyze users' queries to provide search engine optimisation of a document.

There are many search engines on the Internet each with its own method of operating to located web pages within the web. Internet technology is also used to create private corporate networks call Intranets. Intranet networks and resources are not available publicly on the Internet and are separated from the rest of the Internet by a firewall which prohibits unauthorised access to the intranet. Intranets also have search engines which search within the limits of the intranet. In addition, search engines are provided in individual web sites, for example, of large corporations. A search engine is used to index and retrieve the content of only the web site to which it relates and associated databases and other resources.

The described method and system enable a document or a document set such as those retrieved by the system 100 of FIG. 1 to be analyzed to predict its findability. This analysis is achieved without using a query log 107 of past users' queries and therefore without needing to access a search engine 120 for information.

Figure 2:
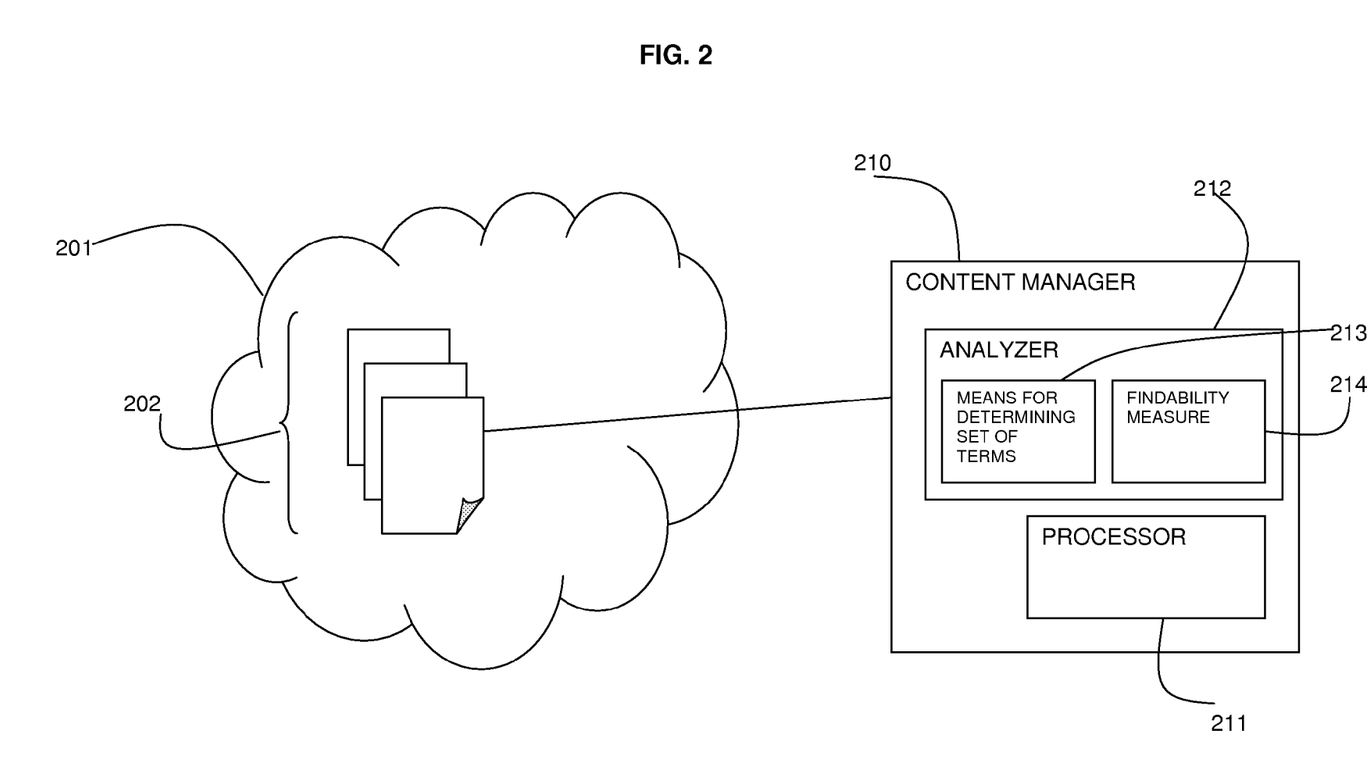
FIG. 2 is a block diagram of a content manager system in accordance with the present invention.

Referring to FIG. 2, an entire document collection 201 is shown schematically including a document or a document set 202 to be analyzed. The document or document set 202 may be a web site, an intranet site, a web page, an intranet page, a web domain, an intranet domain, a database document etc. This is referred to herein as a document set 202, although it will be appreciated that the set may include a single document. The document collection 201 may be the entire web, one or more web sites, an intranet, a database, etc. The document collection 201 may be dispersed across a network or within a database, etc. The document set 202 is retrieved from the document collection 201 by users using search queries.

A content manager 210 is shown which provides and/or manages a document set 202. For example, the content manager 210 may manage a web site or an intranet site. The content manager 210 includes a processor 211 and an analyzer 212 for analyzing the findability of the document set 202 from within the document collection 201. The analyzer 212 includes a means for finding a best set of query terms 213 for the document set 202 and a findability measure 214 for the document set 202.

The document collection 201 may be provided by one or more servers and the content manager 210 may be in direct communication with a server providing the document set 202, or may communicate with it via a network. The analyzer 212 may be provided integrally with a content manager 210, or may be provided to a content manager 210 as a service over a network.

The described method analyzes a document set including the following steps:
1. Identification of the best words, word parts (such as prefixes), word collocates (lexical affinities), or phrases in the document set.
2. Assessing how easily typical users will be able to find content in the document set. This is done by invoking a measure of findability for the document set.
3. Suggesting ways in which findability could be improved by optimizing the content against the new findability measure.
4. Locating content which is similar to the analyzed content.

The described method is based on a model of query difficulty. The model describes the information retrieval process as a matching of queries to relevant documents, both form an underlying topic. The model shows that query difficulty is derived from five distances induced by the difficulty model:
1. The distance between the query/queries and the entire collection.
2. The distance between queries of the same topic.
3. The distance between relevant documents and the collection.
4. The distance between relevant documents.
5. The distance between the queries and the relevant documents.

The Jensen-Shannon divergence (JSD) is used in the described embodiment to measure the distances between objects (sets of documents and queries). In general, other distance measures could be used.

The distance at point 3. above is, in fact, the separation between the relevant documents and the entire collection. It can be thought of as the signal-to-noise ratio of the topic. In order to analyze findability, the JSD distance of a given document set (for example, a given set of web pages or a web site) is measured from the entire collection.

When a document set is provided, the first step is to find a list of words (word parts, word combinations or phrases) that best describe the document set. The Query Coverage (QC) set is defined as the set of terms that minimizes the JSD distance from the given document set. Finding the QC set, given a document set, is NP-hard (non-deterministic, polynomial-time hard); therefore, a greedy algorithm is used. The algorithm builds the QC set incrementally; at each stage it finds a single word that is the closest (in JSD distance) to the document set. This process repeats, and words are added to QC so as to minimize the JSD distance from the document set (or increase it by the smallest amount).

Content managers can evaluate this list and verify that the QC set indeed contains words that users are likely to submit to a search engine when trying to locate their document set. If not, i.e. when the QC set does not contain expected words, this is a good indication of problematic findability.

After the list of best words is formed, a sequence of queries is created, with the first best word, the first two best words and so on, up to the first N best words. The sequence of queries is executed (by any search engine) and the average precision (AP) for each query is computed. The AP for a query is computed by considering the document set as the target set. The resulting curve of AP against the number of terms is then analyzed. This curve shows the findability behavior of a document set.

Taking the example in which a document set is a web site, for one type of site, the maximal AP is achieved by the first word and additional words do not greatly improve it. Other sites, on the other hand, show a dramatic increase with the addition of words. It can be shown that there are three typical findability behaviors:
1. Sites which are easily findable using the first 2-3 best terms.
2. Sites which are not findable even when using very long queries based on the QC set.
3. Sites which require long (5-10) best word queries in order to be located.

By reporting the type the specific site belongs to, site managers can appreciate the findability of their site.

Figure 3A:
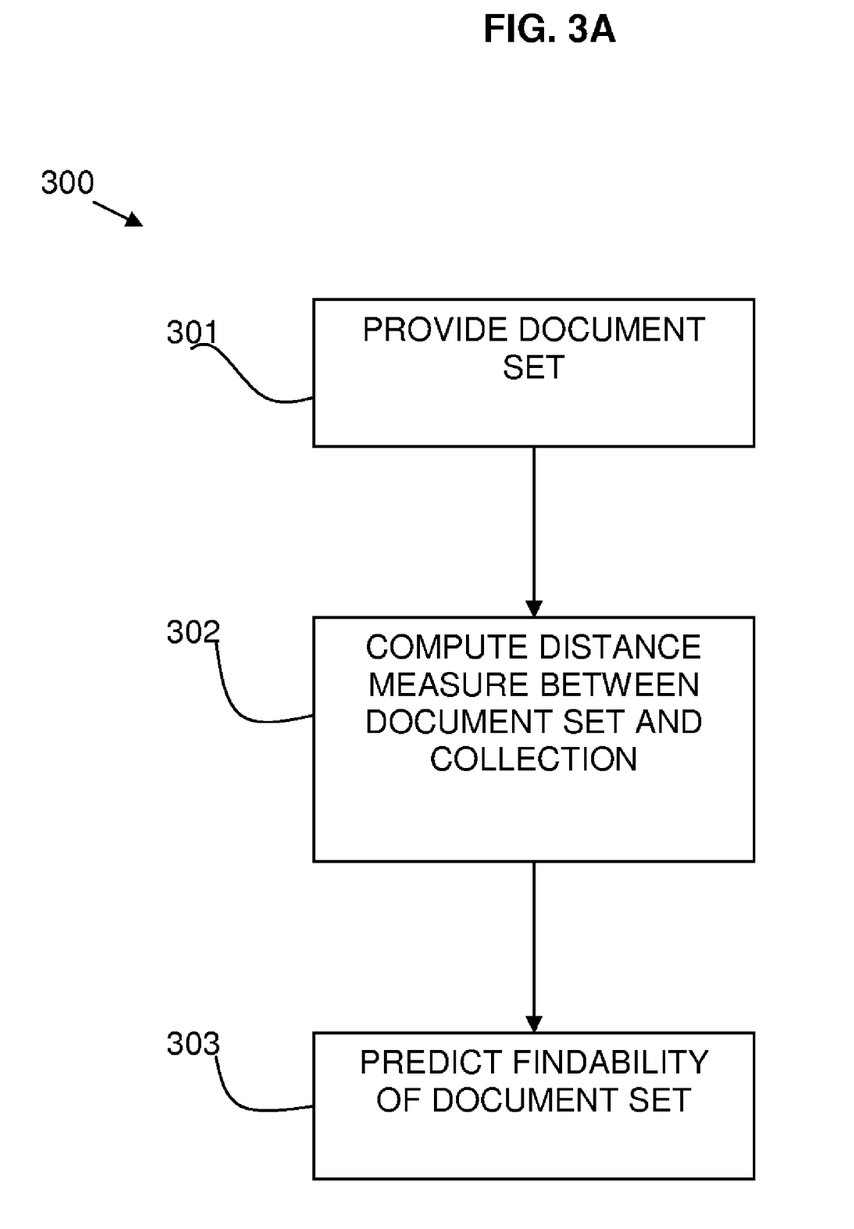
FIGS. 3A and 3B are flow diagrams of methods in accordance with aspects of the present invention.

FIG. 3A shows a flow diagram 300 of one aspect of the method. A document set is provided 301. A distance measure is computed 302 between the document set and an entire collection. A measure of the findability of the document set is predicted 303.

Figure 3B:
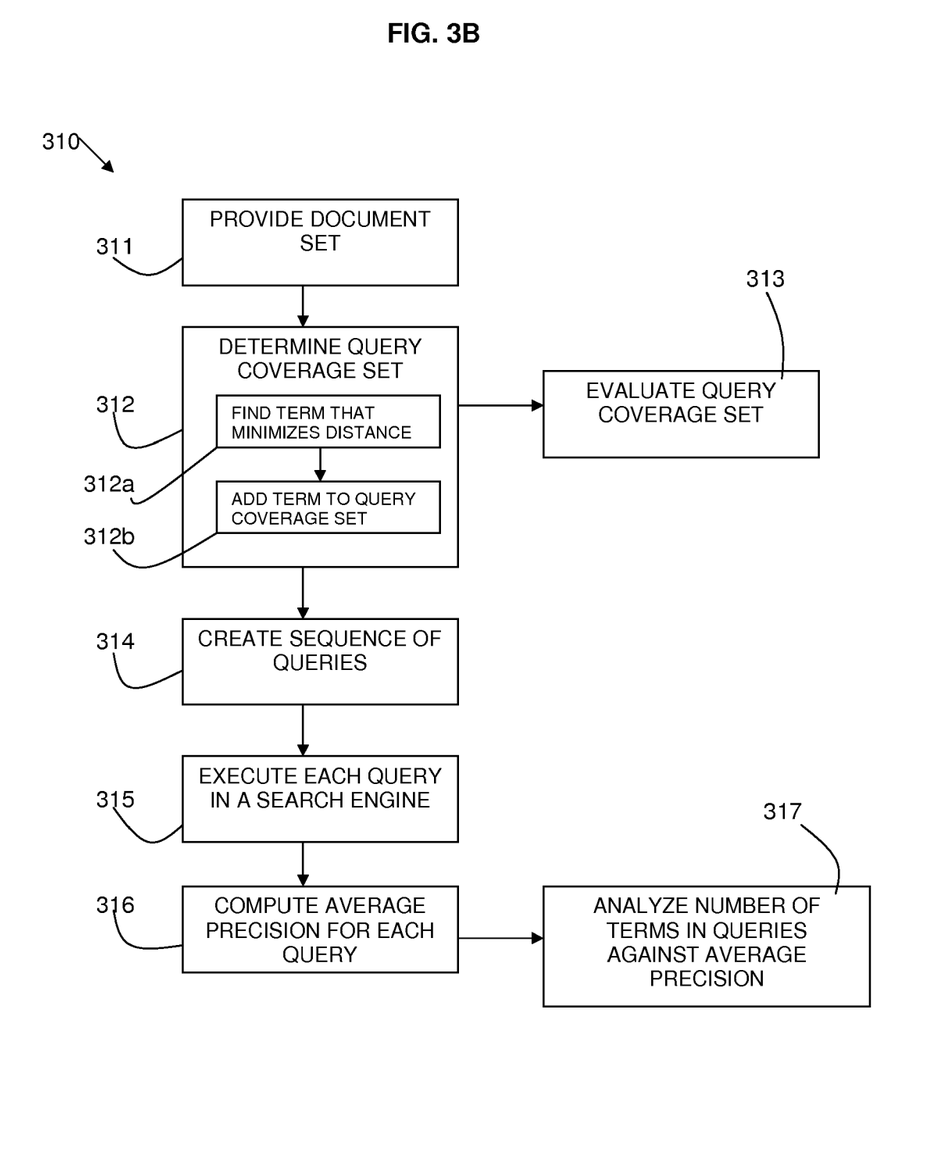

FIG. 3B shows a flow diagram 310 of another aspect of the method. A document set is provided 311 and the Query Coverage (QC) set is determined 312. The QC set can be analyzed 313 for the document set. Step 312 of the flow diagram 310 includes the sub-steps of using a greedy algorithm to find 312a a single word or term that minimizes the distance to the document set and adding 312b the word or term to the query coverage set. This is repeated until a set is compiled.

A sequence of queries is then created 314 and executed 315 in a search engine. The average precision (AP) is computed 316 for each query. The AP for a number of terms can then be analyzed 317 and categorised, if required.

If the results do not meet the content manager's needs, it is possible to simulate how modifications to the content text would affect the findability of the document set, thus providing a way to improve (manually or automatically) the content in order to improve its findability.

Furthermore, a content manager has the ability to check the distance of specific terms to the document set's content. This is useful for examining how good specific terms are in locating the given document set content. Such distance is given either through the JSD distance of the terms to the document set content or through the ranking of the term in the list of best words. For example, a manager of a machine-learning web site might verify that the query "machine learning" is indeed expected to retrieve his site's pages.

Finally, in an intranet and the internet, for each document set the list of best words can be saved. By comparing these lists for different documents sets it is possible to find similar document sets which will confuse a user. Therefore, each content manager will also get a list of similar document sets to his. For example, document sets may be domains in the intranet or the internet.

In addition to finding the best words of the document set and its findability, the described method can detect content which is similar and thus can be confused by the analyzed content. A content manager might be interested in mirror sites, or similar sites to his own site, whose content can interfere with his own content in the search results.

As a worked example, parts of an intranet were partitioned into domains using the owner, feedback, and author pages. This procedure resulted in approximately 260 domains with between 5 and 100 pages. After finding the best words for each of these domains, the average overlap was measured between the words lists. The overlap at different cut-off points was measured and averaged, similar to the computation of Mean Average Precision (MAP). The domains that were most similar were identified.

Difficulty Model

The difficulty model is now described in detail. A typical information retrieval scenario is comprised of a collection of documents and a search engine that retrieves documents in response to user queries. A user submitting a query to the search engine has an idea of the information she is trying to find. She is also able to judge the search results according to their relevance to this information need. Thus, the query and the relevant documents are two facets of the same information need.

Therefore, the primal object of the model is defined to be a "topic". A topic is information pertinent to a defined subject. The topic is comprised of two objects: a set of queries, Q, and a set of relevant documents, R. The queries are possible expressions reflecting the information need, while the relevant documents contain the information satisfying that need. The topic is also dependent on the specific document collection, C, from which R is chosen. Thus, we denote a topic as:

$$\text{Topic}=(Q,R|C) \quad (1)$$

For each topic it is important to measure how broad the topic is and how well it is separated from the collection. In terms of clustering, this is akin to measuring the in-cluster variability and the between-class variability. These measurements can be performed on both facets of the model. An additional measurement, which is of even greater interest, is the distance between the two facets of the model, i.e., the distance between Q and R. It is hypothesized that a large distance translates to a difficult topic while a small distance results in an easy topic.

Figure 4:
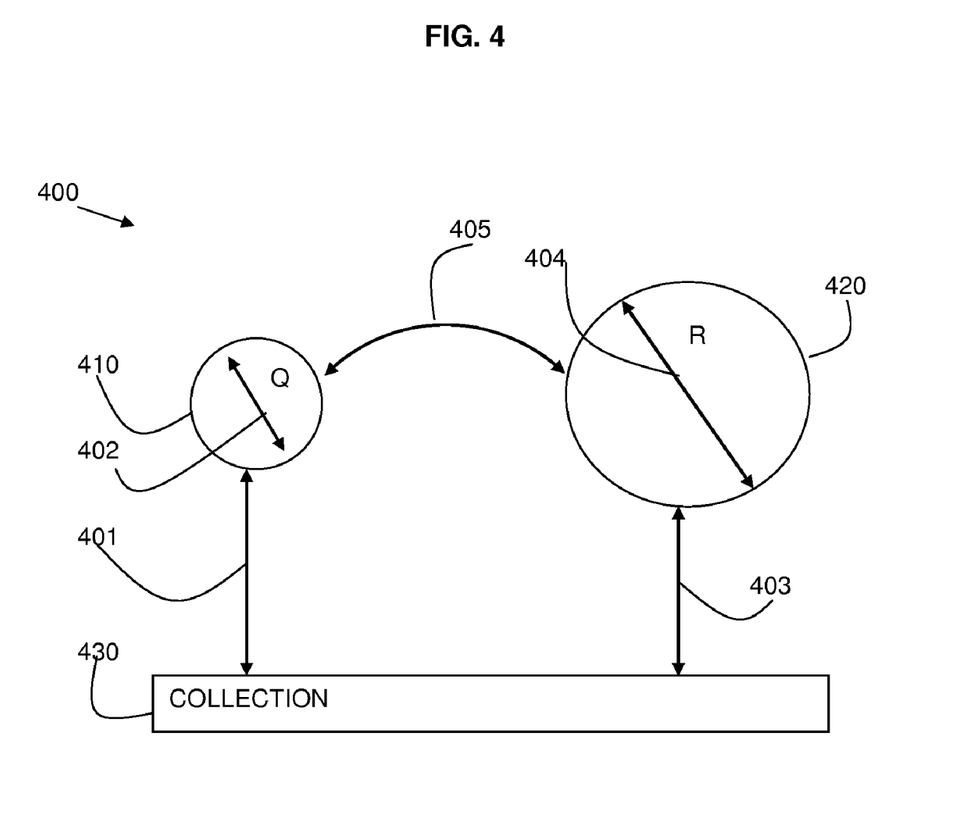
FIG. 4 is a schematic diagram of a topic difficulty model used in the present invention.

FIG. 4 shows a schema 400 of the topic difficulty model and the different distances among its elements. The elements are the queries Q 410, the relevant documents R 420, and the collection C 430.

1. d(Q,C)—The distance 401 between the queries, Q, and the collection, C.
2. d(Q,Q)—The distance 402 among the queries, i.e., the diameter of the set Q.
3. d(R,C)—The distance 403 between the relevant documents, R, and the collection, C.
4. d(R,R)—The distance 404 among the relevant documents, i.e., the diameter of the set R.
5. d(Q,R)—The distance 405 between the queries, Q, and the relevant documents, R.

In some cases, it is possible to obtain only one of the model objects (Q or R). It is assumed that the document collection is always accessible, at least through a search engine.

A search engine manager inspecting the search engine query log has access to the queries regarding a certain topic, but the relevant documents to this topic are not supplied. That is, he has access to the documents in the collection, but the documents are not labeled as relevant to a specific topic. In this case, the model is still very useful, as it is possible to estimate the clarity of the topic according to d(Q,C) and also d(Q,Q) distance where the topic is represented by a set of several queries.

A content manager might not have access to the specific queries users are typing while trying to find the information in her documents, only to the documents or the web pages she manages. In such cases, the model still can be used to estimate how easily her information can be found, by estimating the d(R,C) and d(R,R) distances.

The Jensen-Shannon divergence (JSD) is used to measure distances between objects (sets of documents and queries). The JSD is a symmetric version of the Kullback-Leibler divergence. For the distributions P(w) and Q(w) over the words in the collection w ∈ W, JSD is defined as:

$$D_{JS}(P\|Q) = \frac{1}{2}(D_{KL}(P\|M) + D_{KL}(Q\|M)) \quad (2)$$

where M(w)=½(P(w)+Q(w)), and $D_{KL}(P1\|P2)$ is the Kullback-Leibler divergence of P1 and P2. Thus, explicitly, the Jensen-Shannon divergence can be written as:

$$D_{JS}(P\|Q) = \sum_{w \in W} P(w)\log\frac{P(w)}{M(w)} + \sum_{w \in W} Q(w)\log\frac{Q(w)}{M(w)} \quad (3)$$

The Jensen-Shannon divergence is not a distance (as it does not obey the triangle inequality), but its square root is. Other distance measures such as cosine distance may be used. However, the JSD is preferred over other distance measures because, when measuring distances between documents or queries, the collection statistics can be naturally incorporated into the measurements.

The measures d(Q,C), d(R,C), and d(Q,R) as defined above are all estimated using the Jensen-Shannon divergence between the centroids of the sets Q, R, and C respectively.

To approximate the distribution of terms within documents or queries, the relative frequencies of terms is measured, linearly smoothed with collection frequencies. The probability distribution of a word w within the document or query x, where w appears $n_w$ times in x, is:

$$P(w|x) = \lambda * \frac{n_w}{\sum_{w' \in x} n_{w'}} + (1-\lambda) * P_c(w) \quad (4)$$

where $P_c(w)$ is the probability of word w in the collection, and $\lambda$ is a smoothing parameter. In this work, $\lambda$ was set to 0.9, except when measuring JSD distance between objects and the collection, where it was set to 0.99.

The distribution of the collection is estimated by counting the number of appearances of each word in the entire collection (or a sampling of it) and dividing the count by the word count of the entire collection.

When only Q or R are available (as defined above) the missing set is approximated using the Jensen-Shannon divergence.

Given only a set of relevant documents R, the query coverage (QC) of a set of documents is defined as the set of queries that minimizes the Jensen-Shannon divergence from R:

$$QC(D) = \mathrm{argmin}_{Q''} D_{JS}(Q''\|R) \quad (5)$$

Finding the QC set, given a set of relevant documents, is NP-hard. Therefore, we use a similar greedy algorithm. The algorithm builds the QC set incrementally; it only considers the set of terms belong to R, and at each stage it finds a single word that is the closest in JSD distance to the document set. This process repeats, and words are added to QC so as to minimize JSD distance from the document set or to increase it by the smallest amount. The iterative process results in a list of ranked words. These are the most representative words for the relevant documents, taking into account the collection distribution. The process stops once a minimum is reached and adding a term only increases JSD, or after all the words in the relevant documents are added.

Figure 5:
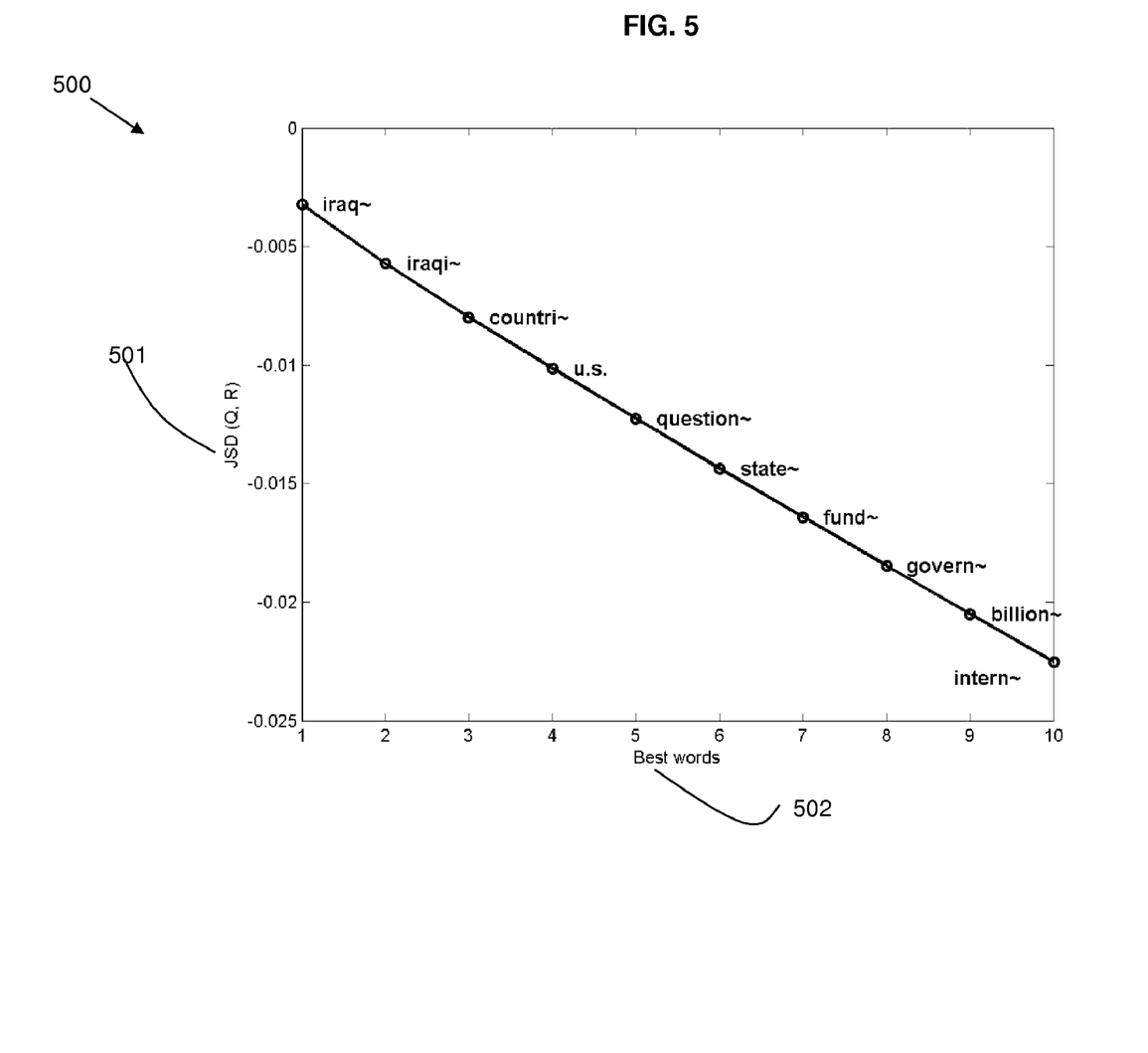
FIG. 5 is a graph showing JSD values for query coverage in accordance with an aspect of the present invention.

FIG. 5 shows a graph 500 of JSD d(Q,R) 501 against the 10 best words 502 for the search query "Iraq foreign debt reduction".

Worked Example.

Experimental validation of the model has been carried out using TREC (Text REtrieval Conference) terabyte topics. The terabyte topics are queries and the documents relevant to these queries, as determined by a human judge. The correlation between the model-induced measurements (JSD distances of the model components) and the average precision (AP) achieved by the search system for the 100 terabyte topics has been measured. This was done using Juru's AP, where Juru (trade mark of International Business Machines Corporation) is a search engine developed by International Business Machines Corporation. The correlation between the model induced parameters and the median AP of all systems that participated in the TREC terabyte tracks was also measured.

As shown in FIG. 4, there are five distances 401-405 of interest in the model. However, because TREC topics provide a single query for each topic, the inter-query distance could not be used. Thus, four distances and their correlation with AP were evaluated.

TABLE 1

| JSD | Juru's AP | | TREC median AP | |
|---|---|---|---|---|
| | Pearson | Spearman's ρ | Pearson | Spearman's ρ |
| d(Q, C) | 0.167 | 0.170 | 0.298 | 0.292 |
| d(R, C) | 0.322 | 0.290 | 0.331 | 0.323 |
| d(Q, R) | −0.065 | −0.134 | −0.019 | 0.004 |
| d(R, R) | 0.150 | 0.141 | 0.119 | 0.155 |
| Combined | 0.447 | | 0.476 | |

Table 1 above shows the Spearman correlation coefficient p and the Pearson correlation values for each of the distances with the AP. The distance of the relevant documents from the collection (shown in bold in the Table 1) is by far the most important factor influencing query precision. The explanation for this phenomena is that a longer distance reflect better separability of the set of relevant documents from the entire collection. The distance of queries to the collection and the number of topic aspects have a lower, yet substantial effect on precision, while the distance of queries to relevant documents, at least for the 100 TREC topics, has almost no effect.

The correlation results of Juru and the TREC median are similar, especially for d(R,C) and d(R,R). The values of Pearson's non-parametric correlation and Spearman's parametric correlation are remarkably similar, suggesting that the values are linearly correlated. The Pearson correlation of AP with all four model parameters (the row denoted by "Combined") is relatively high, suggesting that the model captures important aspects of the query difficulty.

The topic difficulty model is used to estimate the findability of a given collection of documents. It is assumed that a document set of a collection are given, and it is necessary to estimate how easy it is for a user to find these documents.

There are two aspects to this problem. The first is how well the domain's documents are separated from the entire collection. The second is the degree to which typical user queries of the relevant topics covered by that domain correlate with the most informative words of the domain, as reflected by its documents.

The first experiment attempts to quantify the effect of the separability of the relevant documents from the entire collection on the ability to find those documents. The Query Coverage (QC) set for each of the document sets of the 100 training topics were computed. The greedy algorithm used for finding QC results in a ranked list of words, from best to worst. The 10 best words for each topic were used.

For each topic, a sequence of queries was created, with the first best word, the first two best words and so on, up to the first ten best words. The sequence of queries were executed and the AP for each query computed. The resulting curves of AP against the number of terms were then clustered using the k-means clustering algorithm. The results of this clustering (using three clusters) are shown in FIG. 6.

Figure 6:
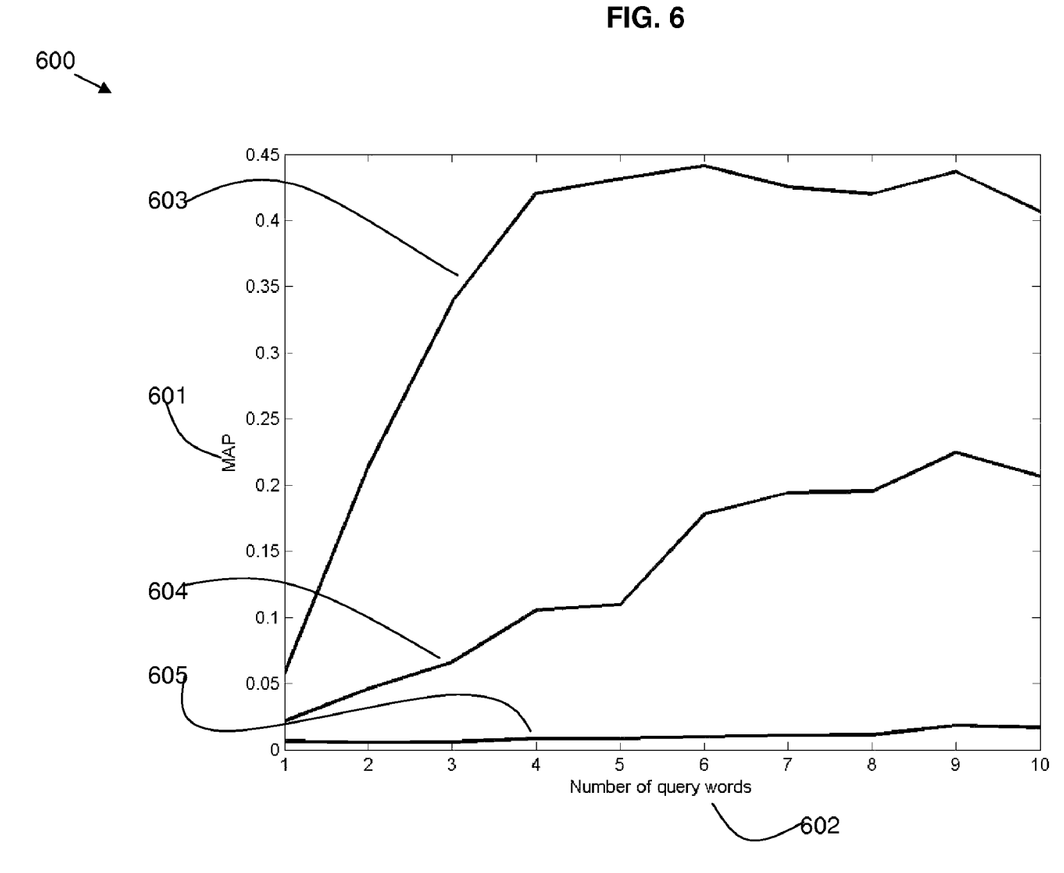
FIG. 6 is a graph showing cluster centers of AP curves for best words in accordance with an aspect of the present invention.

FIG. 6 shows a graph 600 of the MAP 601 against the number of query words 602 clustered into three curves 603, 604, 605. For one type of topics, the maximal AP is achieved by the first word and additional words do not greatly improve it. Other topics, on the other hand, show a dramatic increase with the addition of words. For all topic types, no improvement was achieved by more than nine best words. These curves show typical findability behaviors of a topic, ranging from topics which are extremely difficult to find, no matter how many search terms are used, to topics for which 3-4 query terms are sufficient for archiving high AP.

The Kruskal-Wallis non-parametric one-way ANOVA was used to test whether the partition of topics according to the clusters shown in FIG. 6 was also reflected in the JSD distance between the relevant documents and the collection. The result was extremely significant at p=0.007. The average AP for queries in a cluster based on the best topic terms is higher when d(R,C) is higher. This is in agreement with the correlation values shown in Table 1 above. A useful application of this finding is that it is possible to estimate the findability of a domain (i.e. to which of the three curves in FIG. 6 the behavior of the domain will be) based solely on its separation from the collection, regardless of the specific search engine.

The second experiment relates to the effect of the typical users' query on the ability to retrieve the relevant information. By observing the list of best terms (as described above), a content manager is able to deduce if a "reasonable" user would use such terms when searching for information captured in her document set.

For example, consider the query "Massachusetts textile mills". The first ten most important terms found by the greedy algorithm, in decreasing order of importance are: "Lowell", "mill", "nation", "history", "industry", "area", "park", "NHP" (Neighborhood Health Plan), "work", "heritage". The first two original query terms only appear in locations 12 and 29 respectively (the third one, "mills", appears second). The results indicate that the query "Lowell mill nation", based on the first 3 words in the best-word list, generates an average precision of approximately 3.5 better than that of a query based on the original query terms.

It has been tested how the rank (location) of the users' query terms in the list of best words correlate with the AP. It is assumed that TREC queries based on the topic titles represent typical user queries. The median of the average rank of query terms was approximately 4400, which is a surprisingly high. This shows that the user selected terms are very far from the best terms of the relevant documents.

One of the uses of such a best-word list is to identify problematic document sets that can hardly be found. If the best words are atypical to the information exposed by that document set (e.g. "Lowel" in the example above), or even worst, if the typical terms for that information are ranked low in that list, the document set is expected to suffer from bad findability. Thus, simply looking at the list of best words and trying to comprehend if such words would be used by the typical user can greatly improve the findability of the document set, by document expansion, for instance.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

We claim:

1. A method for document analysis, comprising the steps of:
designating a subset of relevant documents from a document collection;
using a greedy algorithm to establish a query coverage set of words or terms, wherein at each stage thereof a single word or term from the subset of relevant documents is included in the query coverage set, wherein the single word or term minimizes a distance measurement between the document collection and the query coverage set, wherein the distance measurement is determined by constructing a difficulty model for a topic by computing a plurality of distances comprising a first distance between the query coverage set and the document collection (d(Q,C)), a second distance among the query coverage set (d(Q,Q)); a third distance between the subset of relevant documents and the document collection (d(R,C)), a fourth distance among the subset of relevant documents (d(R,R)), and a fifth distance between the query coverage set and the subset of relevant documents (d(Q,R));
storing the query coverage set in a database;
constructing a set of queries from the query coverage set, each of the queries having a number of terms;
executing the queries in a search engine to generate respective results;
responsively to the respective results determining an average precision for each of the queries by considering the subset of relevant documents as representing the document collection;
categorizing the queries by analyzing the average precision against the number of terms thereof; and
reporting respective abilities of the categorized queries to find information in the subset of relevant documents.

2. A method as claimed in claim 1, wherein the document collection and the query coverage set are modelled by probability distributions of the words or terms of the query coverage set and a distance measurement generated between the probability distributions.

3. A method as claimed in claim 1, wherein the terms comprise parts of words or word combinations.

4. A method as claimed in claim 1, including comparing the terms with expected terms to evaluate an ability to find the subset of relevant documents.

5. A method as claimed in claim 1, wherein analyzing the average precision against the number of terms includes clustering results of the queries into categories of behaviour.

6. A method as claimed in claim 5, wherein the categories of behaviour include:
easily findable document sets, document sets requiring long queries to be located, and document sets which are not findable.

7. A method as claimed in claim 1, including simulating changes to text of the document collection to improve an ability to find the subset of relevant documents.

8. A method as claimed in claim 1, including:
comparing a set of terms for a first document set with sets of terms for one or more other document sets: and
determining similar document sets which may be confusable.

9. A method as claimed in claim 8, wherein comparing is carried out by measuring an overlap of the sets of terms.

10. The method according to claim 1, further comprising the steps of:
    partitioning the document collection into a plurality of domains;
    for each of the domains performing the steps of designating a subset of relevant documents, using a greedy algorithm, storing the query coverage set, constructing a set of queries, and executing the queries;
    determining an average overlap among the terms in the queries at a plurality of cut-off points; and
    determining from the average overlap the most similar domains.

11. The method according to claim 1, wherein the distance measurement comprises a Jensen-Shannon divergence.

12. The method according to claim 1, wherein reporting respective abilities of the categorized queries to find information comprises estimating clarity of the topic according to the first distance.

13. The method according to claim 12, wherein reporting respective abilities of the categorized queries to find information further comprises estimating clarity of the topic according to the second distance.

14. The method according to claim 1, wherein reporting respective abilities of the categorized queries to find information comprises further comprises the steps of:
    ranking the words or terms in the query coverage set according to the distance measurement; and
    correlating a presence of the ranked words or terms with words or terms in user queries.

15. The method according to claim 14, further comprising the steps of:
    making a determination that the ranked words or terms have a ranking in the query coverage set that is lower than a predetermined value; and
    responsively to the determination expanding documents of the subset of relevant documents so as to improve the correlated presence of the ranked words or terms in the query coverage set.

* * * * *